E. T. FERNGREN.
APPARATUS FOR FEEDING GLASS TO MOLDS.
APPLICATION FILED SEPT. 5, 1918.
1,414,561.
Patented May 2, 1922.
3 SHEETS—SHEET 1.
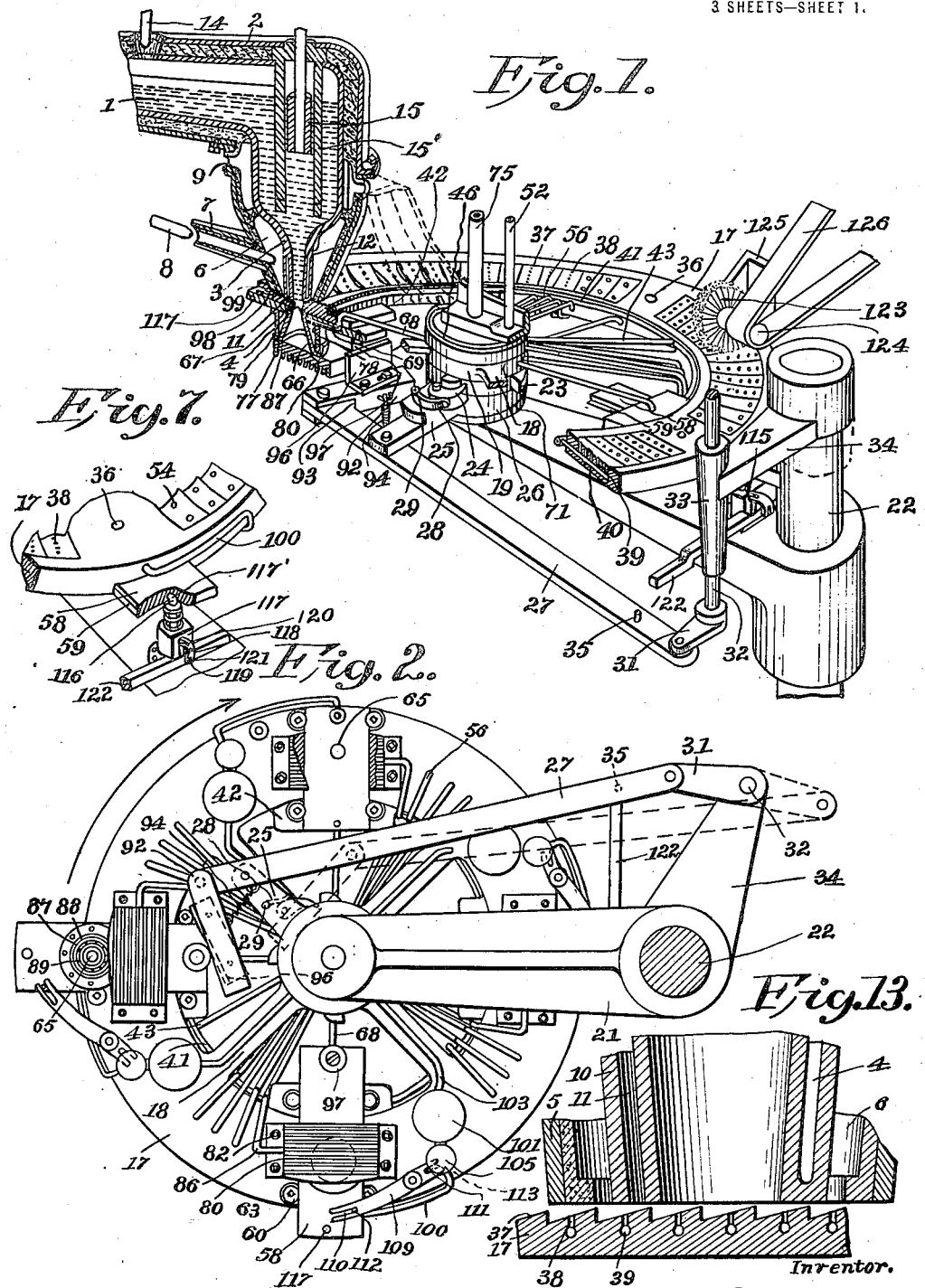
Inventor.
E. T. Ferngren.

E. T. FERNGREN.
APPARATUS FOR FEEDING GLASS TO MOLDS.
APPLICATION FILED SEPT. 5, 1918.
1,414,561.
Patented May 2, 1922.
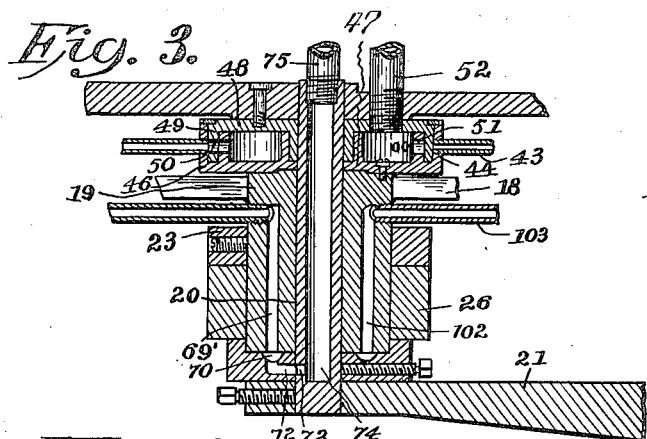
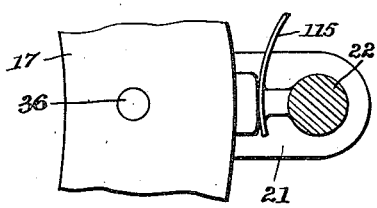
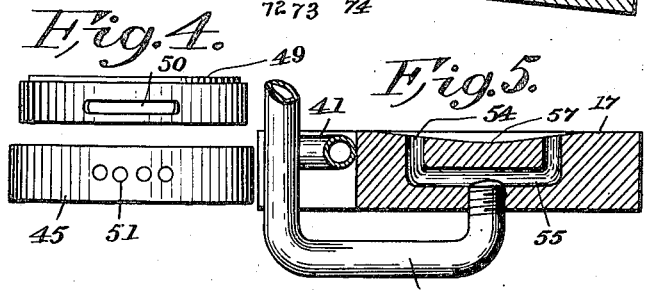
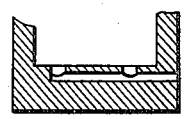
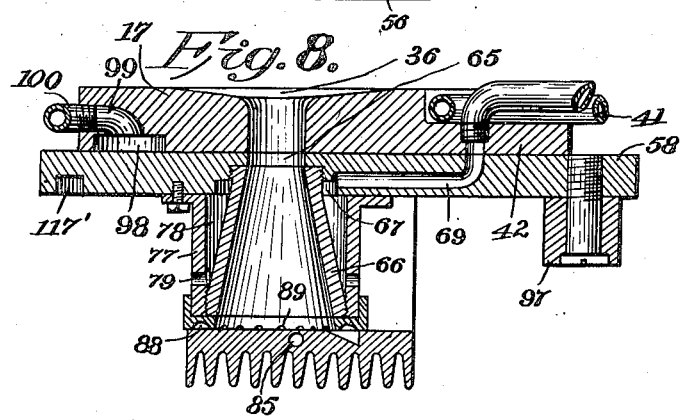
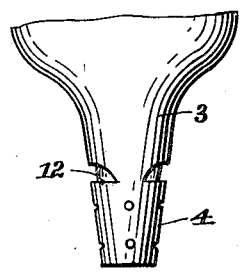
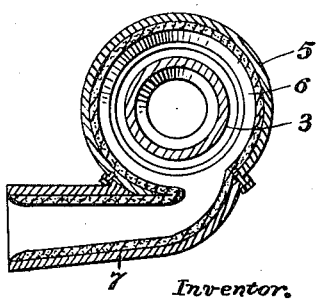
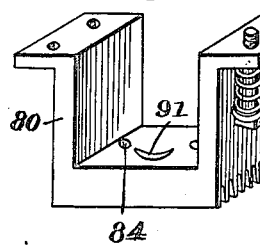
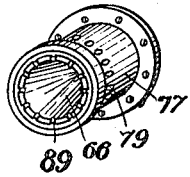
Inventor.
E. T. Ferngren.

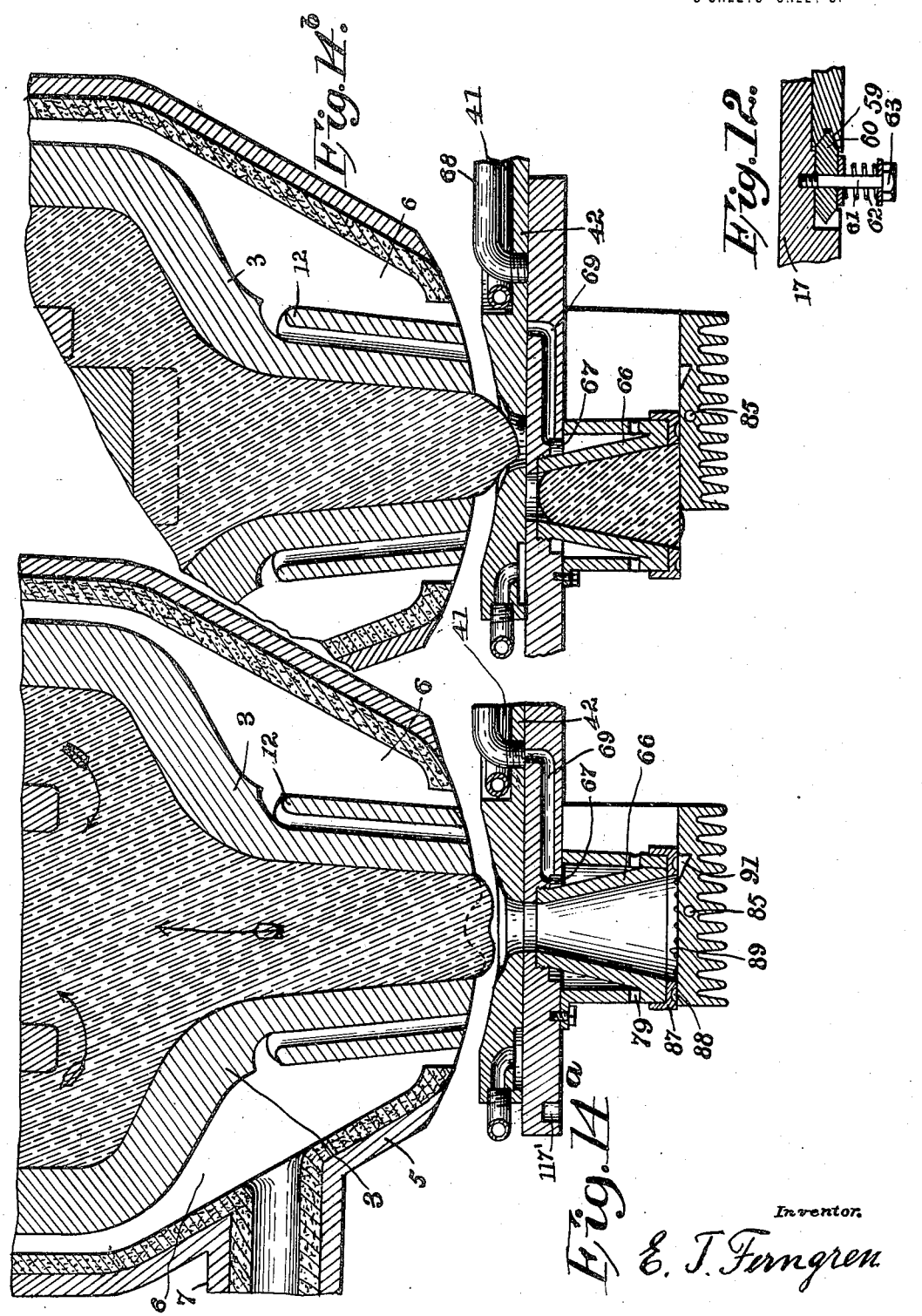

UNITED STATES PATENT OFFICE.

ENOCH T. FERNGREN, OF WASHINGTON, DISTRICT OF COLUMBIA, ASSIGNOR TO HARTFORD-FAIRMONT COMPANY, A CORPORATION OF NEW YORK.

APPARATUS FOR FEEDING GLASS TO MOLDS.

1,414,561.  Specification of Letters Patent.  Patented May 2, 1922.

Application filed September 5, 1918. Serial No. 252,760.

*To all whom it may concern:*

Be it known that I, ENOCH T. FERNGREN, a subject of the King of Sweden, residing at Washington, District of Columbia, have invented certain new and useful Improvements in Apparatus for Feeding Glass to Molds, of which the following is a specification.

This invention relates to apparatus for feeding molten glass from a furnace outlet to molds of different capacities, the operation preferably being of an intermittent order, but the feeding of the glass may also be continuous, being, however, variable in volume, so that the larger amount of glass will be fed out from the furnace outlet during each successive registration of a receiving molding member therewith for the charging of the same with glass, and a lesser quantity of flow prevalent during the interval when the molds are being shifted into position for receiving their charges.

In the manufacture of glass articles when certain methods of accumulative flow gathering of molten glass are utilized in order to obtain a needed quantity for a mold charge, the glass is often injuriously affected and much loss of finished product results. The causes that bring about the injury to the glass may be said to have their root or being in a too rapid or too uneven or a too premature loss of heat units from the glass previous to and during the period of accumulative gathering or assembling of the mold charge in a measuring receptacle or blank mold.

It is the object of this invention to cure such now prevalent defects associated with the gathering of mold charges from an outflow or a stream flow of glass, by providing means and agencies for acting on flowing glass whereby the mold charges may be obtained instantaneously and the glass that composes or makes up each said charge will be maintained in a condition of consistent fluidity, non-impaired and free from any defects, so that better glassware may be produced and no subsequent losses sustained by the manufacturer through the original faulty handling of the molten glass during the obtaining of mold charges from the glass of a melting tank or other glass producing arrangement, and particularly when the glass that forms the charge is delivered from the congenial heat conditions of a melting tank to the congealing or chill imparting condition of a glass taking mechanism by flow or along natural lines of flow.

Flow gathering as now practiced in the art of glass manufacture consists of flowing a stream of glass or an outflow of glass from a refractory furnace part through the air toward the mechanism that is to receive or sever the glass; in most instances a freely flowing stream flow is directed into a mold and when a sufficiency of glass has accumulated the stream of glass is severed above the mold by shearing mechanism that supports the lower end of the oncoming stream during the period required to replace the charged mold with an empty one, when the shears open and the arrested end of the stream of glass as well as the flowing portion descends into the new mold.

In carrying out my invention to overcome the defects of the above described means for varying the speed and amount of the outflow of glass from a furnace in regulated manner, so that said outflow may be caused to occur in large volume only when a hollow receiver or mold is in the act of registration therewith, I also employ means that operate to reverse or to greatly retard the advance of the flow of glass after the severing or cutting off of a mold charge to avoid chilling undersupporting of the glass previous to its entrance into a mold—said means for reversing, when so desired, acting to create a resistance to the force of gravity that actuates the molten glass, causing suspension of outflow through a furnace outlet part directly after the detachment of a mold charge from a preceding voluminous outflow; said resistance force, when glass of material viscosity is used, causing a complete temporary reversal of direction of movement of flow, thereby withdrawing the severed end of outflow from chilling contact with shearing mechanism. Other means for creating an atmosphere of high temperature around the furnace outlet and for delivering heat units to the glass at mouth of outlet, both before and after the obtaining of a cut-off mold charge to dissipate chilling and shear marks and restore uniform fluidity to such portion of the glass that comes in contact with shear mechanism during cutting and was not a portion of the mold charge removed by the cutting action; that is, such glass as remains at the furnace outlet in a state of suspended reversing flow for the next outflow, being sustained thereat a short distance from the shearing means by the forces generated through the action of the means mentioned, is the recipient of additional heat units to replace such as may be lost through any contact with heat unit removing lower temperature machine elements.

An object of the invention is to form a sort of protecting guard of high heat intensity around the exterior of delivering glass, particularly when the glass has been delivered or extended beyond the confines of a furnace outlet or is exposed to contact of momentary duration with glass severing mechanisms.

Another object of the invention is to, so to speak, put out an entire mold charge in one integral mass or body from the furnace outlet, when delivering the same intermittently, and thereafter to cut off the required mold charge from the glass that is being delivered, or immediately after it has been delivered, and thereafter cause the glass in the furnace outlet or conduit to reverse in direction of its movement in such a manner that the flow through the conduit is practically for a moment cut off or suspended directly after the severing operation of the delivery charge of glass.

Still another object of the invention is to reverse the movement of the glass from a furnace outlet or conduit in such a way that the portion thereof which is directly below the opening of the conduit will be bodily elevated or drawn back into the conduit during or after the severing operation, or under certain conditions held in freely suspended condition below the mouth of the outlet, in such relation to the shearing means employed that the glass will be out of contact with such means, and a space provided therebetween, while simultaneously a high temperature atmosphere is caused to bear against that portion of the glass that did contact with the severing mechanism previous to or during severing, whereby such slight chilling as may be imparted to the glass when the same is severed will be entirely dissipated during the momentary interval preceding a succeeding discharge of an integral mass or body charge of glass from the mouth of the conduit.

In the drawings,

Figure 1 is a perspective view of apparatus for carrying out my invention.

Figure 2 is a bottom plan view of the same.

Figure 3 is a vertical sectional view of the hub of the skimming wheel, the vacuum distributing valve and the compressed air connections.

Figure 4 is a perspective of the vacuum valve.

Figure 5 is a sectional view of the rim of the skimming wheel showing the vacuum connections.

Figure 6 is a plan view of the device for resetting the cut off member.

Figure 7 is a perspective view of the wheel locking device.

Figure 8 is a sectional view through the rim of the skimming wheel and glass-receiving member or cup showing the cut-off valve and air passages, and the pocketed shape of the entrance to the feed port that leads to the glass receiver.

Figure 9 is a perspective view of the yoke for the cut-off valve.

Figure 10 is a sectional view of the lower portion of the same.

Figure 11 is a bottom perspective view of the glass-receiving cup.

Figure 12 is a detail view of one of the rollers for the cut-off valve.

Figure 13 is an enlarged sectional view of the nozzle-shaped discharge portion of the conduit taken parallel to the plane of rotation of the skimming wheel.

Fig. 14$^a$ is an enlarged cross section showing the relationships of the parts before the delivery of the charge.

Fig. 14$^b$ is an enlarged sectional view showing the relationships of the parts a fraction of an instant after the charge of glass has been severed.

Fig. 15 is an elevation of the lower end of the delivery nozzle showing a modified form of draft intake.

Fig. 16 is a perspective and sectional showing of a modified construction for imparting a rotatory motion to a hot blast flame for heating the nozzle parts.

1 is a body of glass advancing through a conduit 2 from a furnace (not shown), the outer or delivery end of the conduit being provided with a nozzle 3 through which the molten glass is fed outwardly, and which nozzle has a delivery nipple 4 of less diameter than the passage through the nozzle leading thereto. The nozzle 3 has a jacket spaced therefrom to form a heating chamber 6, and is provided with a conduit 7 through which flame from a burner 8 is delivered to the heating chamber 6 under pressure so as to flow down around and envelop the nozzle and nipple to heat these parts in order that the molten glass may be kept at a temperature suitable for non-restricted flow through the nipple port or the lower mouth of the conduit. Exit ports 9 are provided in the upper portion of the jacket 5 through which the gases that result from the combustion of the flame within the heating chamber may be exhausted.

Surrounding the nipple 4 is an inner jacket 10 forming an annular chamber 11 around the lower portion of the nipple and nozzle shaped portion of conduit, and having an inlet 12 through which flame from the conduit 7 may enter to pass in close contact with the body that forms the lower portion of the nozzle, the lower portion of the chamber being closed, see Figure 13, so that molten glass may be carried off by the skimmer, which will presently be described, and prevent such glass from entering the chamber 11 to in any manner obstruct the same; the remaining lower front portion of said chamber 11 being open to guide the flame below the feeding conduit, all of the lower portions of the main nozzle chamber 6 being open to guide the flame so as to completely surround the glass as it issues from the flow opening or nipple of the conduit. This arrangement of parts at the discharge portion of conduit tends to localize the high temperature effect around the flowing glass both before and after it issues from the outlet portion of the conduit.

In order to maintain the molten glass in the upper portion of the conduit in a normal flowing state, I provide an auxiliary heater 14, comprising a burner adapted for delivering flame into the conduit above the level of the glass that advances therethrough so that additional heat units are delivered to the refractory portion of the conduit and the glass. In order to effect a quick delivery of the fluid from the nozzle 3 I provide a rigid member 15 which is adapted for operation in an inverted well 15' located in the conduit adjacent the nozzle, which member may be actuated in a reciprocatory fashion at stated intervals by any suitable means, not shown, to displace fluid in the nozzle, and thereby cause the molten glass to pass out from the nipple of the nozzle under greater pressure and in a larger volume during each intermittent delivery of the mold charge and cause the glass to be retracted in through the nozzle body and conduit directly after each discharge.

The apparatus for receiving molten glass from the delivery nozzle comprises a revolvable table 17 which preferably comprises a ring or wheel-shaped structure supported by spokes 18, from a hub 19, that is revolvably mounted on a shaft 20 supported on and fixed to an arm 21, on a stationary standard 22. The hub 19 has a rack 23 on its periphery adapted for engagement with a pawl 24 which is pivotally mounted on an arm 25 fixed on a collar 26, that is revolvably mounted on the hub 19, one end of said arm being pivotally connected with a lever 27, whereby the pawl is actuated at regular intervals to forward the table 17; the pawl 24 being yieldingly tensioned toward the rack 22 by a spring 28, which engages one edge thereof and is carried by a curved pin 29, that is fixed on the top of the arm 25.

The lever 27 is pivotally connected with the crank 31 on a shaft 32, that is journaled in a bearing 33 on an arm 34 of the standard 22 and is operated by any suitable mechanism not shown, the lever being provided adjacent the crank with a pin 35 for tripping a table lock, and at its outer end for shifting the glass-receiving cup, which will hereafter be referred to as a measuring mold, as will presently be more fully described.

The table 17 has a circular trough surface in the wheel shape portion thereof adapted for travel immediately beneath the discharge end of the feeding nozzle 3 of the conduit, and has a determined number of pocketed feed ports 36 spaced with reference to the forwarding ratchet, so that each operation of the table will bring one of the ports 36 directly beneath the discharge opening of the nozzle, in which position the table is locked and held a sufficient length of time during each intermittent discharge of the mold charge so as to pass the molten glass through the receiving port into the measuring mold. The trough surface of the table is provided with skimming cups 37 which travel beneath the nozzle opening while the table is in motion, said cups being adapted to receive and remove such molten glass as may flow out and down from the bottom of the nipple when the glass is in a highly fluid state, whereby the glass that is subsequently to be delivered to the measuring mold is maintained in a proper or desired state or condition. The flow of burning gases about the nipple 4 is drawn downward to the skimmer by suction into apertures 38, in the cup flanges, which connect with bores 39 that extend through the lower portion of the table 17 and have nipples 40 of a feed pipe 41 connected therewith. The pipe 41 is extended around the inner periphery of the table and supported on a shoulder 42, which extends inwardly from said periphery, so that the same feed pipe connects with all of the skimming cups, the pipe in turn having a conduit 43 leading to and extending through the outer member 44 of the flange 45 of an air receiver 46 comprising a member 47 which is fixed to and revolvable with the table hub and with which the flange 45 is integral. A stationary member 48 has a lip 49 depending between the members of the flange 45 which form a side joint. The depending lip 49 has an elongated slot 50, see Figure 4, for each of the table receiving ports, and the inner member of the flange 45 has a plurality of apertures 51 adapted for communication with the slot 50, and through the slot with the supply pipe 43. The air receiver connects with the pipe 52 which leads to a suitable apparatus for creating a vacuum. The arrangement of all the parts is such that as the skimmer cups pass beneath the feeding nozzle or discharge mouth of the conduit, communication is established between the cup apertures and the air receiver 46 so that suction through the cup apertures will cause the burning gases that occupy the space below the feed opening of the conduit to flow towards the skimmer and under certain conditions of highly liquid glass in the conduit tend to draw an excessive outflow of molten glass from the feeding nozzle during each succeeding interval between each intermittent delivery of the mold charge, and thereby insure a delivery of virgin properly tempered glass that has had no chilling contact with cooler mechanical parts previous to its reception by the glass-receiving mold or measuring cup.

It is also apparent that, as the skimmer cups pass beneath the feeding nozzle, the apertures 38 communicate through the suctional activity therethrough with the lower open end of the heating chamber 6 and 11 so that the negative pressure is created in the space below the nozzle mouth and a downdraft established at the lower ends of said chambers to rapidly carry the flame along and around the surface of the nozzle 4 and increase the heat thereof and about the flowing glass that issues therefrom.

In order to further ensure the high temperature and molten condition of the glass at the time of delivery to the receiving port 36 in the table 17, I provide the skimming cups immediately in advance of the ports, with apertures 54 which are spaced to avoid or clear the delivery port of the nozzle 4, but communicate with the heating chamber 6 and 11 therein through the suctional activity heretofore described, so that as the table 17 moves below the opening of the conduit nozzle 3 suction through the apertures 54 and the bore 55 by which the apertures communicate, and pipe 56 which connects the bore 55 with the distributor 46, will suck flame in the heating chamber 6 and 11 into the skimmer apertures and induce a strong draft that will materially increase the temperature of the heating chamber 6 and 11 and, consequently, that of the molten glass within the nozzle, thereby increasing the fluidity of the glass and ensuring a large diameter delivery in a rapid manner to the measuring mold during the moment of delivery of the mold charge from the confines of the nozzle portion of the conduit.

Referring now to the receiving apparatus in the table 17, 58 designates slide valves each of which is mounted transversely beneath each port 36 in the table, and which valves have V-shaped grooves 59 within which the V-shaped rollers 60 are engaged for a smooth and easy movement of the valves, said rollers being preferably mounted on stub-shafts 61, carried by the table and yieldingly supported in functional position by springs 62 which are carried by the shaft heads 63, through which spring arrangement each slide valve is held against the lower surface below and around each port opening of the table, with a suitable upward pressure.

Each of the slide valves has an aperture 65 adapted to register with its table port 36 and has a measuring mold 66 suspended therefrom with the receiving opening, in registration with the aperture 65, the portion of the valve around the measuring mold being channeled to provide an annular recess 67, having communication with the feed pipe 68 through a bore 69 in the valve body, the feed pipe 68 in turn communicating with bore 69' in the table hub 19.

The hub bore 69' communicates with an annular trough 70 in a collar 71 fixed to the shaft 20, so that the bore will have a constant communication with the trough 70, while the table 17 is in rotation, and the trough 70 in turn communicates with a bore 72 in the collar, that leads to and registers with the port 73 in the shaft 20, which in turn communicates with the central bore 74 in said shaft and carries a supply pipe 75 which leads to and is fed from a compressor, so that a constant supply of compressed air may be delivered to the annular channel 67 in the slide valve 58 in order that the cooling blast may be delivered around the measuring mold so that it will be kept at a lower temperature than the glass, thereby preventing the glass from sticking to the inner walls of the mold.

In order to confine the cooling blast around the measuring mold, I provide the drum 77 which is suspended from the slide valve and connected with the lower end of the measuring mold to form an enclosed chamber 78 having outlets 79, through which the cooling blast may escape.

The measuring mold is mounted in a yoke 80 which is yieldingly suspended from the bottom of the table 17, preferably being supported on springs 81 carried by the stud bolts 82 which extend through apertures in the yoke flanges 83 into the bottom of the table; the lower portion of said yoke having apertures 84 opening through its upper face and communicating with the bore 85, which is connected with the air receiver 46 by a suitable conduit.

Fixed on the bottom of the measuring member and adapted for sliding travel on the base of the yoke 18 is a ring 87 having an annular groove 88 in its under face, adapted for communication with the base apertures 84 and having notches 89 in the lower edge of its inner bearing surface communicating with the interior of the chamber of the mold of the measuring member so that when same is in receiving position suction is created within the measuring mold which disposes the glass to move quickly and in a large volume sufficient for a full charge from the feeding nozzle at each feeding operation.

In order to assist in drawing in the charge, I provide the base of the yoke with a crescent-shaped pocket 91, which is beveled upward from its outer to its inner edge, and is adapted for communication at its ends with the interior of the chamber that forms the interior of the mold or measuring cup, and at its base with an annular groove 88, so that suction acts in the said chamber at a point between the apertures 84.

Inasmuch as the molten glass comes in contact with the base of the yoke and is moved thereover the base becomes very hot, and in order to cool the same sufficiently to prevent the glass from sticking thereto, I web the lower portion of the base to provide a greater radiating or cooling surface, which tends to effect a very slight congealing of the exterior of the molten mass during its delivering travel; which cooling effect may be regulated by the application of outside cooling means against the web of the yoke in a manner suitable to the operation and temperature of the glass, etc.

After a measured charge of molten glass has been delivered from the outlet nozzle of the conduit to the measuring mold, the flow of glass is cut off by the slide valve 58 by moving the same across the lower end of port 36 in the table 17, the upper edge of the aperture 65 cooperating like a shear with the lower edge of the port opening through the table 17, and simultaneously therewith the measuring mold is moved out of the yoke to a delivery position, in the following manner:

Pivotally mounted on the end of the lever 27 is the block 92, which is yieldingly held backwardly against the boss 93 on said lever by means of a spring 94, but is adapted for outward actuation against the tension of its spring when moved against the pawl arm 25, as the lever 27 is rocked toward the standard 22 by the actuation of the crank 31, so that an adjustable plate 96 that is mounted on said block is moved against the roller 97 on the end of the slide valve to move the latter transversely to cut off the flow of glass to the measuring mold, and to move the same off its base to delivery position.

As the measuring mold reaches a position over the shaping mold, not shown, the aperture 65 in the slide valve 58 assumes a position beneath the cavity 98 in the lower face of the table, which is in communication through a bore 99 with a pipe 100, which communicates with the air storage chamber 101 carried on the bottom of the table, and connected with a bore 102 in the hub 19 by a pipe 103, the hub bore communicating with the supply groove 70 in the collar 71 and through the bore 72 and standard conduits with the compressor, not shown.

A valve 105 located in the pipe 100, between the storage chamber and the cavity 98 regulates the admittance of air to the cavity and from the cavity into the measuring mold as the same registers with the cavity during the moment of delivery of the cut off charge into the shaping mold, not shown. The valve 105 is actuated by a lever 109 which is pivotally mounted on the under face of the table and has grooves 110 and 111 in its opposite ends straddling pins 112 and 113 on the air valve and slide valve, respectively, so that when the slide valve reaches a predetermined position after severing the glass with the intake port 36 the air valve is opened and air under pressure delivered against the molten glass in the measuring mold to force said glass out of the receiving chamber into the shaping mold. The slide valve is returned to initial position by a curved plate 115, which is carried by a standard 22 and wipes the outer end of the slide as the latter approaches the said standard.

The locking of the table is effected by a post 116, which is adapted for vertical movement in a bearing bracket 117 on the arm 21, which carries the table parts, and is yieldingly tensioned upwardly so that it is projected automatically into a socket 117' in the bottom of the outer end of the slide valve when the latter moves thereover, to hold the table firmly in position during the feeding operation. The pin is disengaged from the table by means of a trip 118 which is pivotally mounted on the bracket and has curved slots 119 in its opposite ends, straddling pins 120 and 121, on the locking post and slide bar 122, respectively.

The slide bar is actuated by the pin 35 on the lever arm 27 as the latter is actuated to shift the slide valve beneath the feeding nozzle 3 of the conduit so that the table may be released after each feeding operation. As the glass will congeal in the skimmer portion of the table when cooled I provide means for brushing the same therefrom, such means preferably comprising a brush 123, which is mounted on a shaft 124 that is revolubly mounted in a bracket 125, and which may be driven by a belt 126 by any suitable agency, so that while the table revolves in a horizontal plane beneath the vertically disposed discharge portion of the conduit the brush will revolve vertically above the table in contact with any glass that may have collected or congealed thereon by reason of discharge from the nipple of the conduit, during the interludes between the intermittent putting forth of the mold charge from the nozzle, or any other glass that by reason of high fluidity may leak or dribble from the nozzle part at irregular intervals, or which may happen to remain above the severing plane in the skimmer ports under certain conditions of fluidity of the glass during the feeding operation.

With reference and referring to the rigid member 15, said member, as shown in Fig. 1, is located directly above the line of flow discharge of the nozzle of the conduit, and when reciprocated, causes a thrusting current in the line of flow through the nozzle and a reversing current back into the portion of nozzle that lies above the severing mechanism, the duration of such reversing depending upon the period of operation desirable in which to have the glass flow remain suspended.

During the filling or charging of the measuring mold there obtains a supporting effect from the intake that leads thereinto. This supporting effect, as well as the suctional activity within the mold, produces an almost instantaneous filling of the mold cavity, the downward stroke of the plunger materially assisting in said action, and by said co-operating forces the incoming glass is caused to flow both laterally and downwardly as a swelling bulging form of glass within the mold cavity, the action, of course, being very rapid.

The influence of the refractory member or plunger 15 upon the glass is shown in Figs. 14a and 14b, Fig. 14a illustrating the upward trend of the glass in the path of the upwardly receding plunger and showing the spaced relationship between the mouth of the intake port 36 in the table and the lower previously reversed portion of the glass from which the preceding mold charge had been severed. The dotted line in the mouth or nipple orifice of the nozzle of the conduit indicates in a fashion the extent of elevation or reversal of the glass from the retreat of the plunger member 15; the arrows indicating the general stream line of movement into the member 15′ previous to the downward stroke of the plunger for the effecting of the discharge of an accurate amount of glass in one mass or body, as heretofore mentioned. The space afforded between the skimmer element and the glass at the mouth of the nozzle provides or affords room for the free sweep of a high temperature flame from the heating chambers 6 and 11 in advance of the positioning of the mold member.

This action, as shown in Fig. 1, takes place recurrently before each alignment and a similar action of less magnitude is successively present during successive intervals as the table rotates beneath the discharge nozzle. This localizing of a high temperature around the portions of the glass that have previously come in contact with the cutting member of the port 36 and surrounding surfaces delivers a sufficient number of heat units to the contacted portion of the glass, restoring same to a desirable uniform fluid state.

Fig. 14b illustrates the first movement of the retraction of the glass by the sustaining forces brought into play by the receding action of the plunger upwardly into the well or tube 15′. As shown, the glass charge has just been cut from the glass discharged from the nozzle and the plunger is in act of ascent, causing an inceptive lift from the pocket of the shearing port, which is of importance, as through this lifting of the glass prolonged chilling association of the glass with the shearing means is avoided.

In operating the apparatus the glass is forwarded from a melting tank, not shown, through the conduit 2 and flows downwardly therethrough. The plunger or rigid member 15 operates to suitably variably modify the flow or to intermit the same, affording a support to the glass through its manner of movement above the lower portion of the nozzle portion of the conduit. Each time the plunger is caused to descend the rotation of the table 17 brings a measuring mold into receiving position in time to receive the glass, as shown in Fig. 14a. The mold cavity is then charged with one mass of glass in an instantaneous fashion and coincident therewith the cut-off valve is caused to be projected across the port of the table, severing the glass in the measuring mold from that in the port thereabove. As illustrated in Fig. 14b, the preferable action is to reverse the plunger slightly before the complete severance of the charge so that the instant the severing is accomplished the sustaining retroacting forces that communicate through the glass on account of its molecular viscosity will lift the severed end of glass out of the mold port in the table. When the glass has been elevated by said action to the position shown by the dotted lines in Fig. 14a a return movement takes place, due to the fact that the glass that is in contact with the walls of the nozzle is less and less influenced after the first momentary force action thereupon, the force of gravity restoring or causing a state of almost suspended equilibrium in the glass in the mouth of the conduit.

When the glass is of higher fluidity and less viscosity a continuous flow movement of glass will be present from the mouth of the nozzle or flow opening of the conduit, a complete cutting off of the flow therethrough being almost impossible except in cases of rapid operation where many mold charges are continually put forth from the mouth of the conduit by the action of the plunger, when intermittent suspending of flow in rapid succession is possible, in the manner above described, as shown in Fig. 14a.

Claims.

1. In an apparatus for separating molten glass into mold charges, the combination of a container for the glass provided with a submerged discharge outlet, a hollow member having its lower end submerged in the glass opposite the outlet and spaced therefrom, and rigid means for creating a flow of the glass in said member toward and from the outlet.

2. In an apparatus for separating molten glass into mold charges, the combination of a container for the glass having a submerged discharge outlet, a hollow member having its lower end submerged in the glass above the outlet and spaced therefrom, rigid means for creating a flow of the glass in said member toward and away from the outlet, and severing means beneath the outlet for severing mold charges from the discharged glass.

3. In an apparatus for separating molten glass into mold charges, the combination of a container for the glass provided with a submerged discharge outlet, a tube having its lower end submerged in the glass above the outlet, and a plunger mounted for reciprocation within the tube to control the movement of the glass in the outlet.

4. In apparatus for separating molten glass into mold charges, the combination of a container for the glass provided with a submerged discharge outlet, a tube having its lower end submerged in the glass above the outlet, a plunger mounted for reciprocation within the tube to control the movement of glass in the outlet, and severing means beneath the outlet for severing mold charges from the discharged glass.

5. In apparatus for separating molten glass into mold charges, the combination of a container for the glass provided with a submerged discharge outlet, severing means beneath said outlet for severing mold charges from the discharged glass, a tube having its lower end submerged in the glass above the outlet, and a plunger mounted for reciprocation within the tube to retract or retard the glass in the outlet subsequent to the operation of the severing means.

6. In apparatus for separating molten glass into mold charges, the combination of a container for the glass provided with a submerged discharge outlet, severing means beneath said outlet for severing mold charges from the discharged glass, a tube having its lower end submerged in the glass above the outlet, and a plunger mounted for reciprocation within the tube by its downward motion to accelerate and by its upward motion to retard the discharge of glass through the outlet.

7. In apparatus for separating molten glass into mold charges, the combination of a container for the glass provided with a submerged discharge outlet, severing means operating periodically beneath said outlet for severing mold charges from the discharged glass, a tube having its lower end submerged in the glass above the outlet, and a plunger mounted for reciprocation within the tube to accelerate by its downward motion the discharge of glass prior to the severing operation, and to retard by its upward motion the discharge of glass subsequent to the severing operation.

Washington, D. C., September 5, 1918.

ENOCH T. FERNGREN.